Sept. 25, 1962  G. I. ROBERTS  3,055,601
COIL FORMING MEANS TO PROVIDE SYMMETRICAL RESISTANCE
IN A MULTI-COIL ELECTRICAL DEVICE
Original Filed June 16, 1955

INVENTOR.
GEORGE I. ROBERTS
BY
*Herbert L. Davis*

ATTORNEY

1

3,055,601
COIL FORMING MEANS TO PROVIDE SYMMETRICAL RESISTANCE IN A MULTI-COIL ELECTRICAL DEVICE
George I. Roberts, Maywood, N.J., assignor to The Bendix Corporation, a corporation of Delaware
Original application June 16, 1955, Ser. No. 515,929, now Patent No. 2,972,449, dated Feb. 21, 1961. Divided and this application May 5, 1960, Ser. No. 27,136
4 Claims. (Cl. 242—1.1)

The present application is a division of U.S. application Serial No. 515,929 filed June 16, 1955 by George I. Roberts, now U.S. Patent No. 2,972,449, granted February 21, 1961, and assigned to The Bendix Corporation. The invention relates to the art of coil winding and more particularly to the means for obtaining symmetrical direct current resistance in multiphase devices such as a synchro, motor, solenoid, magnetic amplifier and the like.

The invention shows a means for forming the end turns of an inductive device having multiple similar type coils wherein the direct current resistance of said coils is electrically balanced by the controlled length of respective coil conductors due to conformation of the coil end turns.

Instrumentation, particularly in the field of aviation, requires devices that are small, compact, and efficient, yet extremely robust. Some electrical instruments, such as inductive devices having stators present unique problems in winding the coils thereof which usually are of very fine wire. The manufacture of these devices frequently requires care and specialized techniques. The present invention concerns a method and means for overcoming certain of the difficulties encountered in the winding of stators for electrical devices.

The present invention may be used, for example, in conjunction with a coil winding machine of the general type described in my co-pending U.S. patent application Serial No. 425,527 filed for Stator Coil Winding Device, now U.S. Patent No. 2,936,961, granted May 17, 1960, and is of the general nature of the invention set forth in my U.S. patent application Serial No. 433,775 for Method and Means of Making Stator Coil End Turns, now U.S. Patent No. 2,810,848 granted October 22, 1957. The assignee of said applications and patent is Bendix Aviation Corporation, now by change of name The Bendix Corporation, the assignee of the instant application.

In the aforementioned patent applications and patent, the stator to be wound is removably fixed within a stator nest which is stationarily positioned within the winding machine. In the U.S. Patent No. 2,810,848 there is shown a preformed insulator having a plurality of lugs thereon which receive the end turns of coils of wire as they are being wound. There is one preformed insulator on each face of the stator. The present invention differs generally from the device disclosed in U.S. Patent No. 2,810,848 in that in the present invention there is shown means not only for forming the end turns of the coils as to symmetry for ease in winding, but also for forming the end turns so that each coil of a series of similar coils will have a direct current resistance equal to that of each of the other similar coils.

Another application Serial No. 506,564, for a device for severing coil form winding elements, the assignee of which is Bendix Aviation Corporation, now by change of name The Bendix Corporation, assignee of the instant application, relates to the specific means for severing the forming ring and removing the stator from the stator nest 21.

There are various types of synchro devices. One of these types uses a multiplicity of coils with certain of said coils having like characteristics different from other coils of said device.

For example, in the aforementioned patent applications and in the present invention there is shown a stator member or shell to be wound having nine slots therein.

In the present application the completed stator member or shell has nine coils of three different general types characterized by the number of turns in each coil and the pitch.

The complete stator member or shell of a device referred to herein may have three coils of 12 turns each, three coils of 34 turns each, and three coils of 52 turns each.

The present example refers only to the three coils of 52 turns each. The 52-turn coils are particularly discussed herein because each of the 52-turn coils is wound in the stator slots so that each has a cross-over with one end of each of the remaining two coils of the 52-turn type. The three 52-turn coils shown herein are representative of the problem encountered in multiple similar type coils which have a cross-over of the coils. Since the coils must be wound one at a time, obviously the earliest wound coil would rest flat against the stator and would have end turns which are shorter in length than the coils which are wound later. Consequently, the coils having the longer end turns would naturally have a greater resistance than the coils having the end turns shorter in length, assuming the size of the wire, pitch and other characteristics to be the same. Therefore, it should be clear that in precision instruments where it is necessary to have similar type coils with different end turn conformations yet each having a resistance equal to that of each of the other coils, it is necessary to provide some means for equalizing the resistances of the respective coils.

It is an object of the present invention to provide a novel means for obtaining uniform resistance between coils normally having different end turn conformations but of the same general type employed in an electrical device.

A further object is to provide symmetrical resistance in the coils of multiphase electrical devices.

A further object is to provide a novel means for obtaining substantially uniform resistance of coils of the same general type in an electrical device of the kind set forth.

A further object is to provide a novel means for making the end turns of multiple coils an equal length, so that the direct current resistance of said coils will be substantially uniform.

A further object is to provide novel end turn forming means for stator coil winding wherein the end turns of certain of said coils are preshaped to control the electrical resistance thereof.

Another object of the invention is to provide novel means for controlling resistance of coils of wire as wound in an electrical device by preshaping the end turns of said coils for the purpose of controlling the length of the conductor of said representative coils.

A further object is to provide novel means for balancing the direct current resistance of coils in an end turn forming device by providing forming means for controlling the length of wire.

A further object is to provide novel means for balancing the direct current resistance of coils by preshaping each of said coils to obtain a controlled length, with each of said coils having a shape different from each of said other coils in the same general type or group of coils.

The present invention contemplates end turn forming means to control the length of total wire in various coils to provide symmetrical resistance in multiphase devices. One way, as disclosed and claimed in my co-pending U.S. application Serial No. 515,929, is to have projections positioned so that the wire of the coil will have to be formed around the projection, the size and position of the projection determining the amount of wire to be added to the coil. The projections are in addition to the forming ring lugs or flanges normally used in form winding. The second way, as specifically disclosed and claimed in the present application, is to control the length of each end turn of wire by having the wire carrying surface of certain of the lugs or flanges disposed a predetermined distance from the axial center of the stator. Different coils each of which may have a different general radius so that multiphase devices may employ in coil winding, end turn lugs or flanges with surfaces having different radii from a fixed point as determined by the required symmetrical resistance.

The foregoing and other objects and advantages of the invention will appear more fully hereinafter from a consideration of the detailed description which follows, taken together with the accompanying drawings wherein an embodiment of the invention is illustrated by way of example. It is to be expressly understood, however, that the drawings are for illustration purposes only and are not to be construed as defining the limits of the invention.

Figure 1:
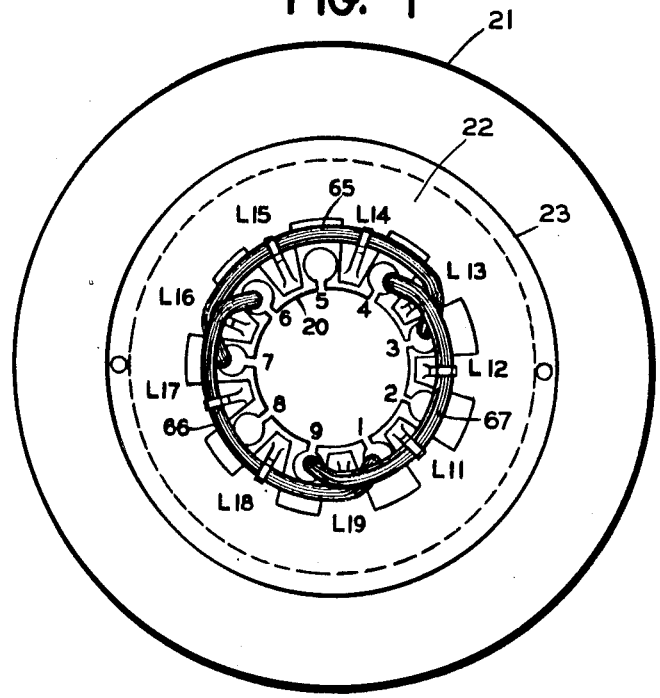
FIGURE 1 is an end view of an end cap or end turn forming ring positioned over a stator member or shell, which stator is carried by a stator member or shell nest and which end cap or ring includes means of providing symmetrical resistance by controlling the length of wire and of the end turns.

Referring to the drawings in FIGURE 1, a stator nest 21 is shown having a stator member or shell 20 positioned therein. There is an end cap end turn forming ring 22 mounted on each of the opposite end faces of the stator nest 21. The end turn forming ring or end cap 22 has an annular flange 23, and like the forming ring shown in FIGURES 1 and 2 of the co-pending U.S. application Serial No. 515,929 has nine lugs. The forming ring or end cap 22 may be held to the corresponding face of the stator nest 21 by push fittting the annular flange 23 thereof into a complemental groove provided in each of the opposite end faces of the stator nest 21 and keying the same in a proper radial position. However, the flanges or lugs in FIGURES 1 and 2 of the present application, while they are for the purpose of receiving the end turns of wire of the coils for placing the wire in the proper slots and keeping the wire clear of the intervening slots, have an additional function.

Figure 2:
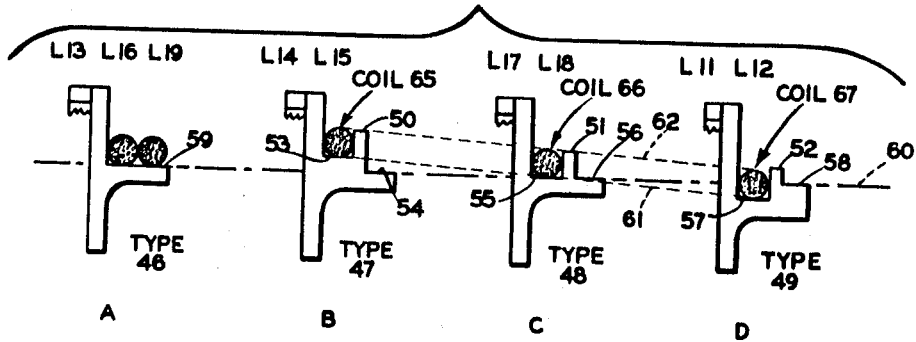
FIGURE 2 shows 4 different side views, namely A, B, C, and D, of four different type flanges or lugs used on the end cap or end turn forming ring of FIGURE 1.

As shown in FIGURE 2, there are four views, namely, A, B, C, and D. The slots in FIGURE 1 are numbered from 1 to 9 in a counter-clockwise direction, and the forming ring lugs or flanges are numbered L–11 to L–19 inclusive. The flanges or lugs and slots shown in FIGURE 1 are in the same respective position as the lugs and slots shown in relation to FIGURE 1 of the co-pending U.S. application Serial No. 515,929. However, it will be seen that in the four different side views shown in FIGURE 2 of the present application the lug or flange shown in FIGURE 2A has its wire supporting surface at a predetermined radius from the center of the stator member or shell for the purpose of controlling the length of conductor in the end turn to provide electrical symmetry in the coils.

In FIGURE 2 the views A, B, C and D have the four lugs type 46, 47, 48, and 49. Lugs in views 2B, 2C and 2D each have a vertical portion 50, 51, and 52, respectively. On either side of the projections 50, 51, and 52 there are wire supporting surfaces. FIGURE 2B has an inner wire supporting surface 53 and an outer wire supporting surface 54. FIGURE 2C has an inner wire supporting surface 55 and an outer wire supporting surface 56. FIGURE 2D has an inner wire supporting surface 57 and an outer wire supporting surface 58. The lugs type 46 serve as projecting wire end turn members in which the wire supporting surface 59 of FIGURE 2A is shown on the same plane as the wire supporting surface 54 of FIGURE 2B, 56 of FIGURE 2C, and 58 of FIGURE 2D, all of said surfaces being shown in the same plane by the reference dash-dot line 60, which is drawn through a given radius of all four views of FIGURE 2. The outer wire supporting surfaces 54, 56 and 58 may provide surfaces on which other sets of coils may be wound and which coils have not been shown as the same are considered unnecessary to an understanding of the present invention.

The inner wire supporting surfaces 53 of FIGURE 2B, 55 of FIGURE 2C and 57 of FIGURE 2D, are all shown at different levels relative to the plane represented by the reference dash-dot line 60. Surface 53 is above the reference line 60, surface 55 is on the reference line 60, surface 57 is below the reference line 60, and each surface has a different radius from the axial center of the stator shell so that in relation to the axial center of the stator shell, the surface 53 provides an outermost flange surface, the surface 55 provides an intermediate flange surface, and the surface 57 provides an innermost flange surface. Dotted lines 61 and 62 are drawn across the bottom and top surfaces, respectively, of the coils carried by the wire supporting surfaces 53, 55 and 57 to stress the different levels of the wire carrying surface as shown in FIGURE 2. Actually, the radius of the wire carrying surface, when referred to herein, means the distance from the axial center of the stator shell to the wire carrying surface, such as 53. It will be seen in FIGURE 1 that lugs or flanges L–14 and L–15 have the wire carrying outermost flange surfaces 53 which describe an arc, the radius of which is greater than the radius of the arc defined by the wire carrying intermediate flange surfaces 55 of lugs or flanges L–17 and L–18. The wire carrying innermost flange surface 57 of lugs L–11 and L–12 would describe an arc having shorter or smaller radius than either the radius provided by the wire supporting outermost and intermediate flange surfaces 53 and 55, shown in FIGURES 2B or 2C.

Coil 65 is wound in slots 3 and 7. Coil 66 is wound in slots 1 and 6, while coil 67 is wound in slots 9 and 4, as shown. Lug L–16 of the type 46 serves as a projecting wire end turn member and is positioned at a cross-over point for coils 65 and 66. Lug L–13 also of the type 46 serves as a projecting wire end member and is positioned at a cross-over point for coils 65 and 67. It will be seen that the coil 65 which is wound first of the three coil series lays flat against the forming ring and, consequently, will require flanges or lugs, such as L–14 and L–15 which have the wire carrying outermost flange surfaces 53 which surfaces have a radius from the center of the stator shell, which is greater than that of the wire carrying intermediate and innermost flange surfaces 55 and 57 of the other lugs.

After coil 65 is wound, the coil 66 is then wound on the stator. In this case since a portion of the coil 66 is wound over the projecting wire end turn member or lug L–16 and also is wound so as to overlap a portion of coil 65, which produces an axial bend or formation, and is further wound over a projecting wire end turn member or lug L–19 of the type 46 positioned at a cross-over point for coils 66 and 67, it will be seen that the coil 66 will further require lugs L–17 and L–18 of type 48 which have a wire carrying intermediate flange surface 55 with a radius shorter than that provided by the outermost flange surface 53 of the flanges or lugs L–14 and L–15 of type 47 required for coil 65.

Coil 67 which is the third of the three coils in the series to be wound will overlap a portion of each of the coils 65 and 66 and therefore the radius of the wire carrying innermost flange surface 57 of lugs L–11 and L–12 of FIGURE 2D was made shorter than that of the wire carrying outermost and intermediate flange surfaces 53 and 55 of the flanges or lugs shown in FIGURES 2B and 2C.

From the foregoing it will be seen that the lugs of the type 46 shown in FIGURE 2A and used at the crossover points, provide projecting wire end turn members which have carrying surface 59 at a uniform predetermined radius from the axial center of the stator; while the end turns of each of the coils 65, 66 and 67 are supported by lugs of the types 47, 48 and 49 respectively which have wire carrying surfaces defining the distance of the outermost, intermediate and innermost wire carrying flange surfaces 53, 55 and 57 from the axial center of the stator.

From the foregoing, it will be seen that the direct current resistance of the three coils is balanced by the novel means shown in FIGURE 1 in which the wire carrying outermost, intermediate and innermost flange surfaces 53, 55 and 57 of the lugs for the respective coils are so arranged that the general arc of the various coils each has a radius which is different from the radius of the other end turns of the coils in the series.

The present invention is a means for minimizing the direct current unbalance effects on residual, fundamental and harmonic voltages in control synchro circuits. The invention minimizes or effectively eliminates the direct current resistance unbalance effects on electrical error in any synchro circuit.

Although but one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A method of winding a shell of an electrical apparatus having a plurality of radially extending slots therein which comprises providing a pair of similar end caps including radially spaced concentric outermost, intermediate and innermost flanges having surfaces which progressively decrease in radius from the outermost flange to the innermost flange and which surfaces define outermost, intermediate and innermost wire end turn receiving zones, said caps being provided with radially extending slots which are adapted to register with the slots in the shell to be wound; applying one of said caps to each end of the shell to be wound with the slots in the end caps in register with the slots in said shell, winding a plurality of first loops of winding wire in a selected pair of the slots in said shell with sections of said first loops being disposed in the outermost wire end turn receiving zones of said end caps, winding a plurality of second loops of winding wire in another selected pair of the slots in said shell with said second loops of winding wire overlapping a portion of said first loops of winding wire and with sections of said second loops being disposed in the intermediate wire end turn receiving zones of said end caps, and winding a plurality of third loops of winding wire in still another selected pair of the slots in said shell with said third loops of winding wire overlapping a portion of each of said first and second loops of winding wire and with sections of said third loops being disposed in the innermost wire end turn receiving zones of said end caps.

2. A method of winding a shell of an electrical apparatus having a plurality of radially extending slots therein which comprises providing a pair of similar end caps having radially spaced concentrically arranged outermost, intermediate and innermost flanges having surfaces which progresseively decrease in radius from the outermost flange to the innermost flange and which surfaces define outermost, intermediate and innermost wire end turn receiving zones, said caps being provided with radially extending slots which are adapted to register with the slots in the shell to be wound; applying one of said caps to each end of the shell to be wound with the slots in the end caps in register with the slots in said shell, winding a plurality of first loops of winding wire in a selected pair of the slots in said shell with sections of said first loops being disposed on the surfaces defining the wire end turn receiving zones of the outermost flanges of said end caps, winding a plurality of second loops of winding wire in another selected pair of the slots in said shell with said second loops of winding wire overlapping a portion of said first loops of winding wire and with sections of said second loops being disposed on the surfaces defining the wire end turn receiving zones of the intermediate flanges of said end caps, and winding a plurality of third loops of winding wire in still another selected pair of the slots in said shell with said third loops of winding wire overlapping a portion of each of said first and second loops of winding wire and with sections of said third loops being disposed on the surfaces defining the wire end turn receiving zones of the innermost flanges of said end caps.

3. In a coil forming means to provide symmetrical resistance in a multi-coil electrical device of a type including a stator nest for receiving a stator member, said stator member having slots arranged in consecutive relation for receiving wire of coils to be wound in the slots, and coil forming means affixed to the stator nest and adapted to be positioned adjacent opposed faces of the stator member, said coil forming means comprising lugs for carrying the wires of the coils to be wound in said slots, a plurality of projecting wire end turn forming members, said coil forming means including means for mounting said projecting wire end turn forming members adjacent opposed faces of the stator member and in a predetermined relation immediately between the consecutive slots so that wires of the coils to be wound in each of said consecutive slots may be turned at the face of the stator member over one of the projecting wire end turn forming members, the lugs of the coil forming means having wire carrying flange surfaces positioned different predetermined radial distances from the axial center of the stator member, the lugs being positioned between alternate wire end turn forming members, and the relative positions of the wire carrying flange surfaces of the lugs and the end turn forming members being so arranged that there may be effected a total length of said wires such as to provide symmetrical resistance in said coils of the electrical device when so wound.

4. In a coil forming means to provide symmetrical resistance in a multi-coil electrical device of a type including a stator nest for receiving a stator member, said stator member having slots for receiving wire of coils to be wound in the slots, coil forming means affixed to the stator nest and adapted to be positioned adjacent opposed faces of the stator member; the improvement comprising said coil forming means including wire end turn forming members positioned at predetermined radial distances from the axial center of the stator members, a plurality of sets of lugs, each of said sets of lugs for carrying the wire of one of the coils to be wound in the slots so that the wire of one of said coils may be turned at the face of the stator member about a pair of the wire end turn forming members, the wire of other of said coils may be turned at the face of the stator member so as to overlap portions of the wire of said one coil, the wire of one of said other coils may be turned at the face of the stator member about another of said wire end turn forming members, and the wire of the remainder of said other coils may be turned at the face of the stator member so as to overlap a portion of the wire of said one other coil, and each of said sets of lugs including wire carrying surfaces different from the wire carrying surfaces of the lugs of said other sets of lugs by being positioned different predetermined radial distances from the axial center of the stator member, the sets of lugs being positioned between alternate wire end turn forming members, and the predetermined positions of the wire carrying flange surfaces of the lugs and the end turn forming members being so arranged that there may be effected by the wire carrying flange surfaces of said sets of lugs and the wire end turn forming members a total length of said wires such as to provide symmetrical resistance in said coils of the electrical device when so wound.

References Cited in the file of this patent
UNITED STATES PATENTS 2,647,696     Brunand _____ Aug. 4, 1953